US012760799B2

(12) United States Patent
Favilla et al.

(10) Patent No.: US 12,760,799 B2
(45) Date of Patent: Oct. 13, 2026

(54) PNEUMATIC VALVES, PNEUMATIC APPARATUSES, AND METHODS FOR CONTROLLING PNEUMATIC FLOW

(71) Applicant: The Boeing Company, Arlington, VA (US)

(72) Inventors: Stephan J. Favilla, Monroe, WA (US); Andrew P. Newton, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 118 days.

(21) Appl. No.: 18/804,244

(22) Filed: Aug. 14, 2024

(65) Prior Publication Data

US 2026/0098583 A1 Apr. 9, 2026

(51) Int. Cl.
*F16K 3/24* (2006.01)
*F16K 31/12* (2006.01)

(52) U.S. Cl.
CPC .............. *F16K 3/246* (2013.01); *F16K 31/12* (2013.01); *B23Q 2705/04* (2013.01)

(58) Field of Classification Search
CPC .. F16K 3/246; F16K 31/1221; F16K 31/1223; F16K 11/02; F16K 17/0473; F16K 17/065; B23Q 5/06; B25B 5/061
USPC .................................... 137/625.12, 628, 629
See application file for complete search history.

(56) References Cited

U.S. PATENT DOCUMENTS 1,430,533 A * 10/1922 Brown .................. B05B 7/1209 239/528
2,564,896 A * 8/1951 Gustafsson ........... B05B 7/1481 137/625.48
3,012,592 A * 12/1961 Wright ..................... B67D 7/48 141/225
3,137,314 A * 6/1964 Woodhall .................. F16K 5/02 137/625.12
4,013,088 A * 3/1977 Gocke ..................... E03C 1/108 137/218
7,614,529 B2 11/2009 Bolyard, Jr. et al.
8,091,649 B2 1/2012 Kosuge et al.
8,919,380 B2 * 12/2014 Zhou ....................... F16K 11/02 137/625.5
9,133,941 B2 9/2015 Lin et al.
9,702,123 B2 7/2017 Patel et al.
9,910,447 B2 * 3/2018 Pettinaroli ................ F16K 1/42
10,843,019 B2 * 11/2020 Kim ....................... A62C 35/58
(Continued)

FOREIGN PATENT DOCUMENTS

WO 2011015929 A2 2/2011
WO WO-2018090075 A1 * 5/2018 ......... F16K 31/1221

*Primary Examiner* — Umashankar Venkatesan
(74) *Attorney, Agent, or Firm* — Walters & Wasylyna LLC

(57) ABSTRACT

A pneumatic valve includes a valve body, a valve chamber, an inlet port, a tool port, an accessory port, and a valve plug. The valve chamber has a longitudinal axis. The inlet port is formed through the valve body non-parallel to the longitudinal axis. The tool port is formed through the valve body non-parallel to the longitudinal axis. The accessory port is formed through the valve body parallel to the longitudinal axis. The valve plug is situated in the valve chamber and is movable along the longitudinal axis to selectively open and close a pneumatic flow between the inlet port, the accessory port, and the tool port in response to relative pressure differential between the valve chamber and the inlet port.

20 Claims, 14 Drawing Sheets

(56) References Cited

U.S. PATENT DOCUMENTS

| | | | | |
|---|---|---|---|---|
| 11,572,960 | B2 * | 2/2023 | Guillou | F16K 17/0433 |
| 2004/0060719 | A1 * | 4/2004 | Wiborg | B24B 55/10<br>173/218 |
| 2020/0232572 | A1 * | 7/2020 | Lyon | F16K 3/246 |
| 2022/0196181 | A1 * | 6/2022 | Saldanha | B64D 25/14 |

* cited by examiner

PNEUMATIC VALVES, PNEUMATIC APPARATUSES, AND METHODS FOR CONTROLLING PNEUMATIC FLOW

FIELD

The present disclosure relates generally to pneumatic tools and, more particularly, to pneumatic valves for tools and accessories having a valve mechanism for selectively controlling the pneumatic flow.

BACKGROUND

Various manufacturing operations utilize pneumatic tools. Many of such operations also utilize a pneumatic accessory that operates concurrently with the tool and that uses the same pneumatic flow as the tool. However, this configuration requires an operator to manually turn the accessory ON and OFF independent of operating the tool. Accordingly, those skilled in the art continue with research and development efforts in pneumatic apparatuses and methods for controlling pneumatic flow.

SUMMARY

Disclosed are examples of a pneumatic valve, a pneumatic apparatus, and a method for controlling a pneumatic flow. The following is a non-exhaustive list of examples, which may or may not be claimed, of the subject matter according to the present disclosure.

In an example, the disclosed pneumatic valve includes a valve body, a valve chamber, an inlet port, a tool port, an accessory port, and a valve plug. The valve chamber has a longitudinal axis. The inlet port is formed through the valve body non-parallel to the longitudinal axis. The tool port is formed through the valve body non-parallel to the longitudinal axis. The accessory port is formed through the valve body parallel to the longitudinal axis. The valve plug is situated in the valve chamber and is movable along the longitudinal axis to selectively open and close a pneumatic flow between the inlet port, the accessory port, and the tool port in response to relative pressure differential between the valve chamber and the inlet port.

In an example, the disclosed pneumatic apparatus includes a pneumatic valve, a pneumatic tool, and a pneumatic accessory. The pneumatic valve includes a valve body, a valve chamber, an inlet port, a tool port, an accessory port, and a valve plug. The valve chamber has a longitudinal axis. The inlet port is formed through the valve body non-parallel to the longitudinal axis. The tool port is formed through the valve body non-parallel to the longitudinal axis. The accessory port is formed through the valve body parallel to the longitudinal axis. The valve plug is situated in the valve chamber and is movable along the longitudinal axis to selectively open and close a pneumatic flow between the inlet port, the accessory port, and the tool port in response to relative pressure between the valve chamber and the inlet port. The pneumatic tool is coupled to the tool port of the pneumatic valve. The pneumatic accessory is coupled to the accessory port of the pneumatic valve.

In an example, the disclosed method includes steps of: (1) providing a pneumatic valve that includes: a valve body, including a valve chamber having a longitudinal axis; an inlet port formed through the valve body non-parallel to the longitudinal axis; a tool port formed through the valve body non-parallel to the longitudinal axis; an accessory port formed through the valve body parallel to the longitudinal axis; and a valve plug situated in the valve chamber; (2) coupling a pneumatic tool to the tool port; (3) coupling a pneumatic accessory to the accessory port; (4) supplying a pneumatic flow to the inlet port; (5) moving the valve plug along the longitudinal axis to selectively open and close the pneumatic flow between the inlet port, the accessory port, and the tool port in response to relative pressure differential between the valve chamber and the inlet port.

Other examples of the pneumatic valve, the pneumatic apparatus, and the method will become apparent from the following detailed description, the accompanying drawings, and the appended claims.

DETAILED DESCRIPTION

Figure 1:
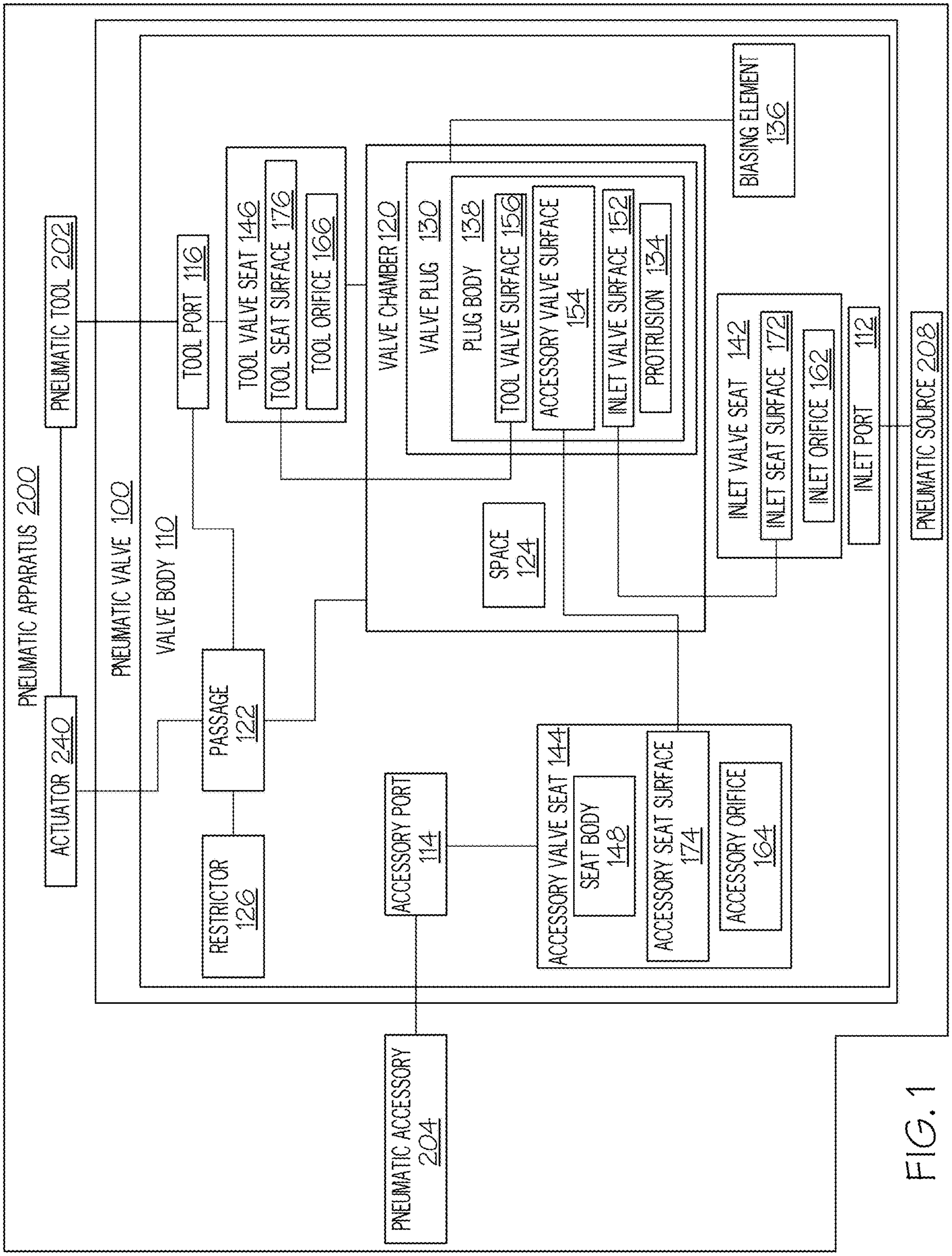
FIG. 1 is a schematic block diagram of a pneumatic apparatus.

Referring generally to FIGS. 1-13, by way of examples, the present disclosure is directed to a pneumatic valve 100, a pneumatic apparatus 200, and a method 1000 for controlling a pneumatic flow.

In various examples, the pneumatic valve 100 serves as a combination of a poppet valve and a spool valve for automatic, selective control of a pneumatic flow to a pneumatic tool 202 and a pneumatic accessory 204. The pneumatic valve 100 includes a first (e.g., accessory port) orifice that is opened and closed by translating a first (e.g., accessory) sealing surface onto and away from the first orifice. An internal biasing element (e.g., spring) holds the pneumatic valve 100 in a closed position. When a biasing force is overcome, the first sealing surface lifts off the first orifice and the valve opens to allow pneumatic flow to the pneumatic accessory 204. The pneumatic valve 100 also includes a second (e.g., tool port) orifice that is opened and closed by translating a second (e.g., tool) sealing surface back and forth over the second orifice for allowing pneumatic flow to the pneumatic tool 202.

Examples of the pneumatic valve 100 utilize a force balanced internal valve mechanism that is controlled using the biasing element and pneumatic pressure at a tool port of the pneumatic valve 100. Demand for flow by the pneumatic tool drops the pressure at a tool port, thereby lowering the pressure at the back of the valve mechanism, driving it to open an accessory port to the pneumatic accessory, which is configured to operate like a poppet valve. The valve mechanism opens the accessory port to the accessory prior to opening the tool port to the pneumatic tool. Continued demand for flow by the pneumatic tool drives the valve mechanism to open the tool port to the pneumatic tool, which is configured to operate like a spool valve. This configuration ensures that the pneumatic accessory runs at full power, regardless of the level of demand from the pneumatic tool. This configuration also enables use of a consistent through port diameter to the pneumatic tool, thereby improving performance. Examples of the pneumatic valve 100 utilize a valve axis that is tilted relative to the inlet axis and tool outlet axis, which provides a difference in position of the valve sealing surface relative to the inlet and outlet. This ensures the tool outlet remains closed, which further drops the pressure on the backside of the valve mechanism, ensuring it stays open in use. Examples of the pneumatic valve 100 also utilize an angled face surrounding the orifice of the accessory outlet, which provides a small amount of force to open the valve mechanism, due to the momentum of the airflow from the inlet to the outlet.

Referring now to FIGS. 1 and 3-13, the following are examples of the pneumatic valve 100, according to the present disclosure. Examples of the pneumatic valve 100 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Figure 3:
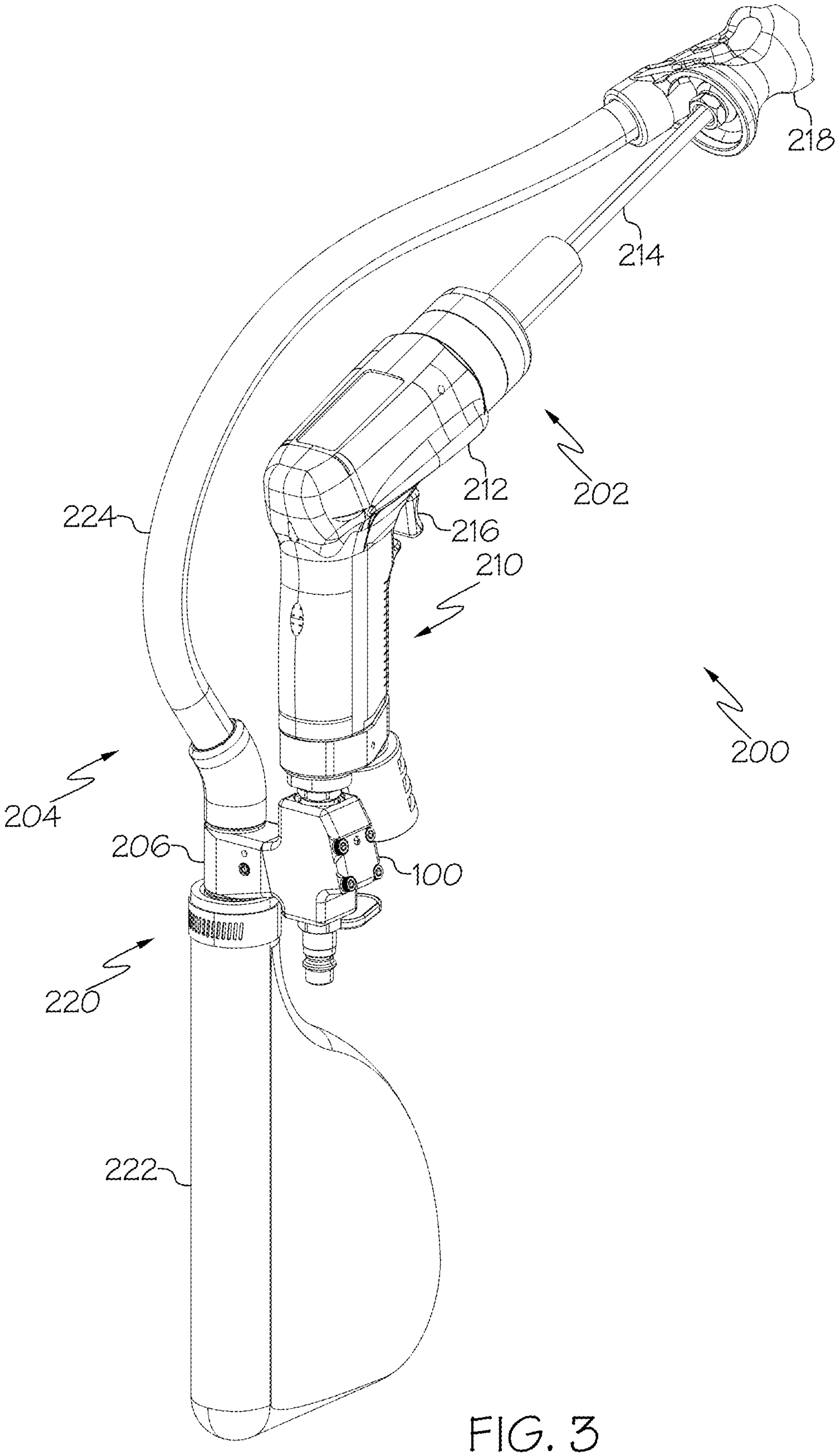
FIG. 3 is a schematic, perspective view of an example of the pneumatic apparatus.
Figure 4:
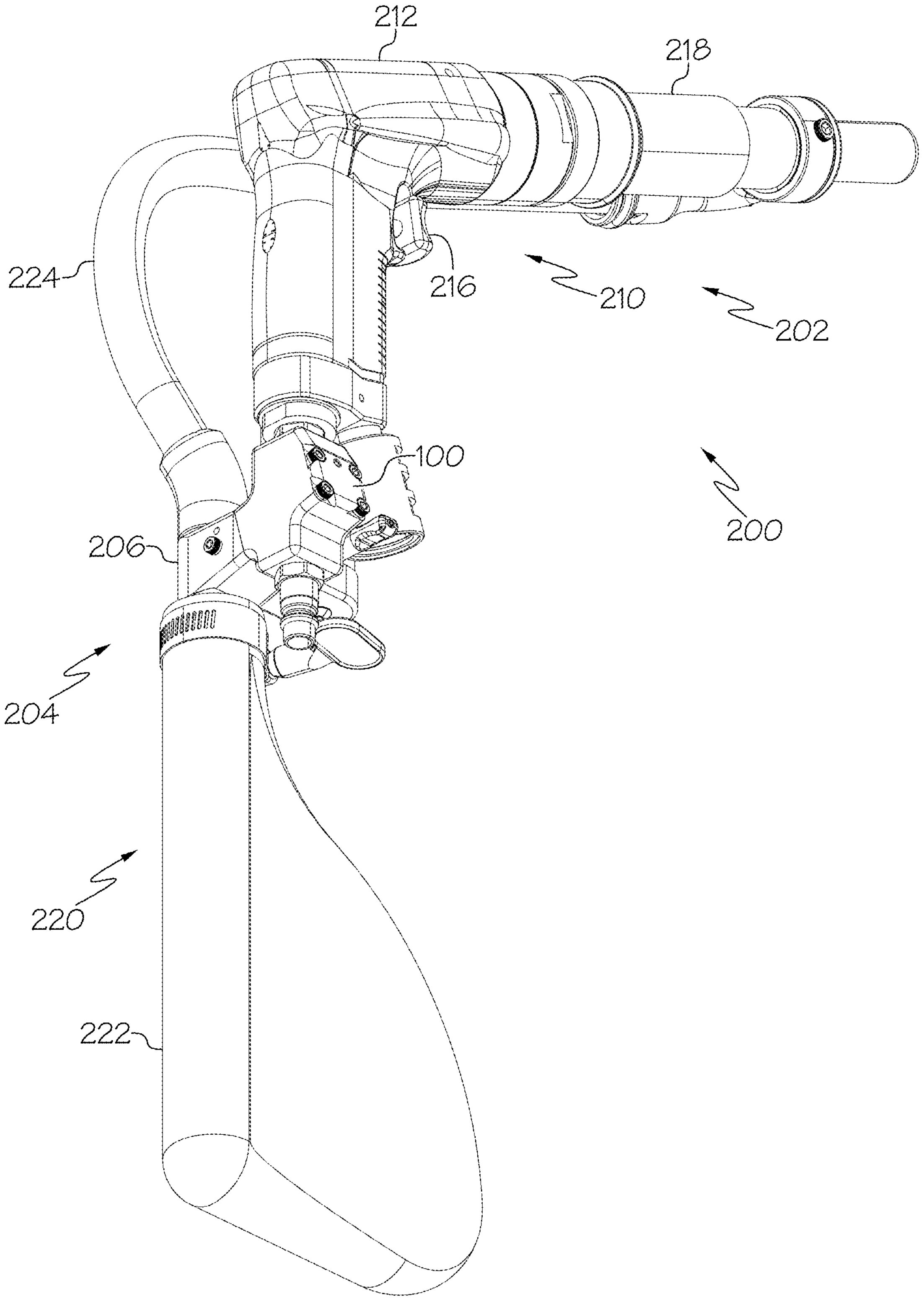
FIG. 4 is a schematic, perspective view of an example of the pneumatic apparatus.
Figure 5:
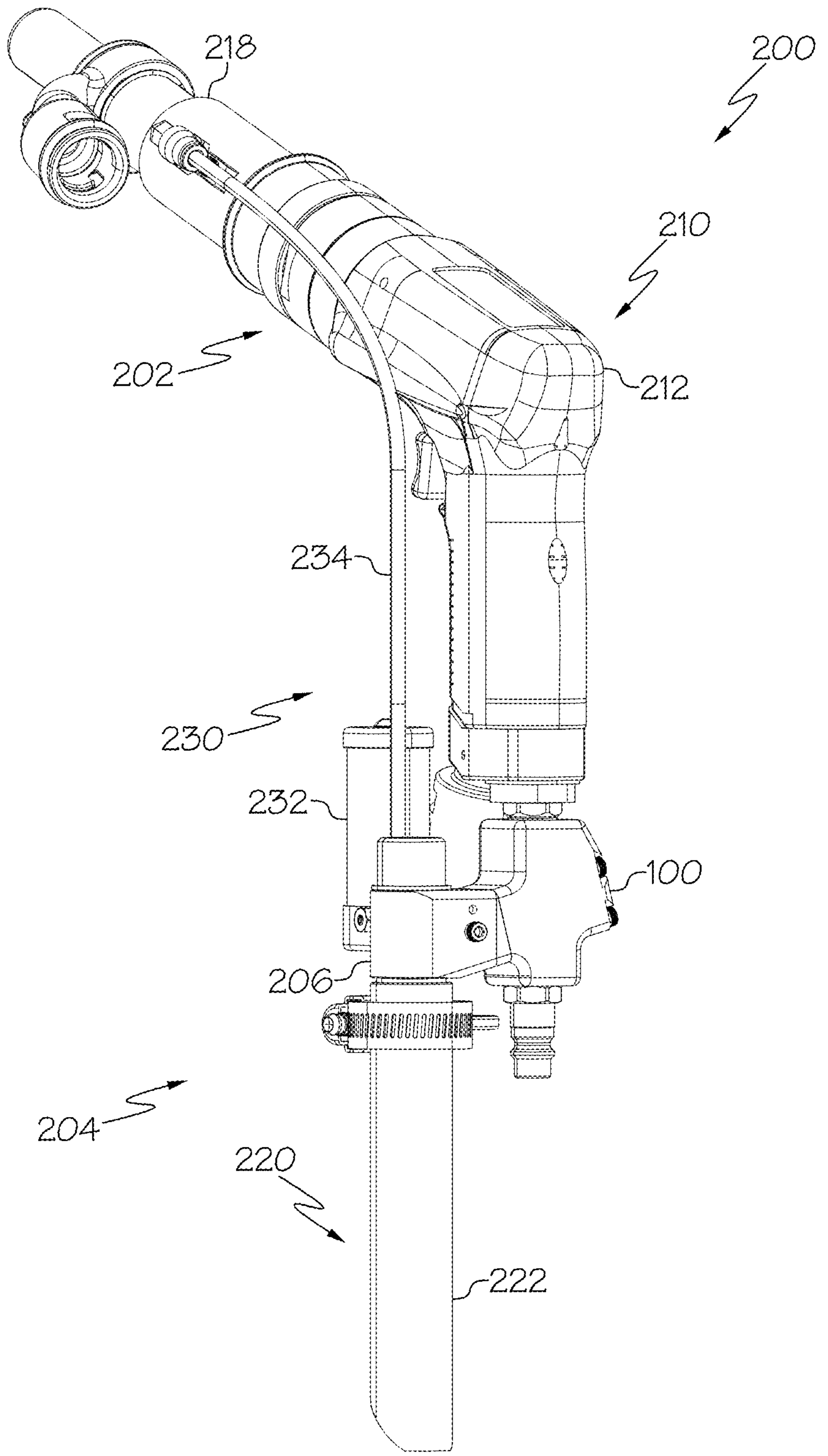
FIG. 5 is a schematic, perspective view of an example of the pneumatic apparatus.

FIGS. 3-5 illustrate examples of the pneumatic apparatus 200 that utilizes the pneumatic valve 100. The pneumatic apparatus 200 includes a pneumatic tool 202 that is coupled to a tool port 116 of the pneumatic valve 100 and a pneumatic accessory 204 that is coupled to an accessory port 114 of the pneumatic valve 100. During use, the pneumatic valve 100 opens a pneumatic flow for operation of the pneumatic accessory 204 before opening the pneumatic flow for operation of the pneumatic tool 202.

The pneumatic tool 202 can include any one of various types of power tools that are powered or driven by compressed air, for example, supplied by an air compressor. The pneumatic tool 202 can also be driven by compressed carbon dioxide, for example, stored in cylinders. Generally, the pneumatic tool 202 includes a pneumatic motor 212, a tool attachment 214 (e.g., a bit, socket, blade, cutter, etc.) that is coupled to and driven by the pneumatic motor 212, and a switch 216 (e.g., trigger) that energizes the pneumatic motor 212. In the illustrated examples, the pneumatic tool 202 includes a nose piece 218 that covers or encloses at least a portion of the tool attachment 214. In the examples illustrated in FIGS. 3-5, the pneumatic tool 202 includes a drill 210. In other examples, the pneumatic tool 202 includes an air hammer, a cutter, a wrench, a saw, a sander, a grinder, and the like.

The pneumatic accessory 204 can include any one of various types of accessories that are driven or operated using compressed air. The pneumatic accessory 204 includes an adapter 206 that is coupled to the accessory port 114 of the pneumatic valve 100. In the examples illustrated in FIGS. 3-5, the pneumatic accessory 204 is a vacuum 220 configured to collect debris created during a manufacturing operation using the pneumatic tool 202. As an example, the vacuum 220 includes a venturi vacuum 222 and a vacuum hose 224 that is coupled to the venturi vacuum 222 and the nose piece 218 for delivering suction. In the example illustrated in FIG. 5, the pneumatic accessory 204 includes a dispenser 230 configured to dispense a working fluid (e.g., lubrication, adhesive, etc.) to the tool accessory during a manufacturing operation using the pneumatic tool 202. As an example, the dispenser 230 includes a pump 232 and a dispensing tube 234 that is coupled to the pump 232 and the nose piece 218 for delivering the working fluid. In other examples, the pneumatic accessory 204 includes an air blaster, another (e.g., second) pneumatic tool or pneumatic motor, and the like.

Figure 6:
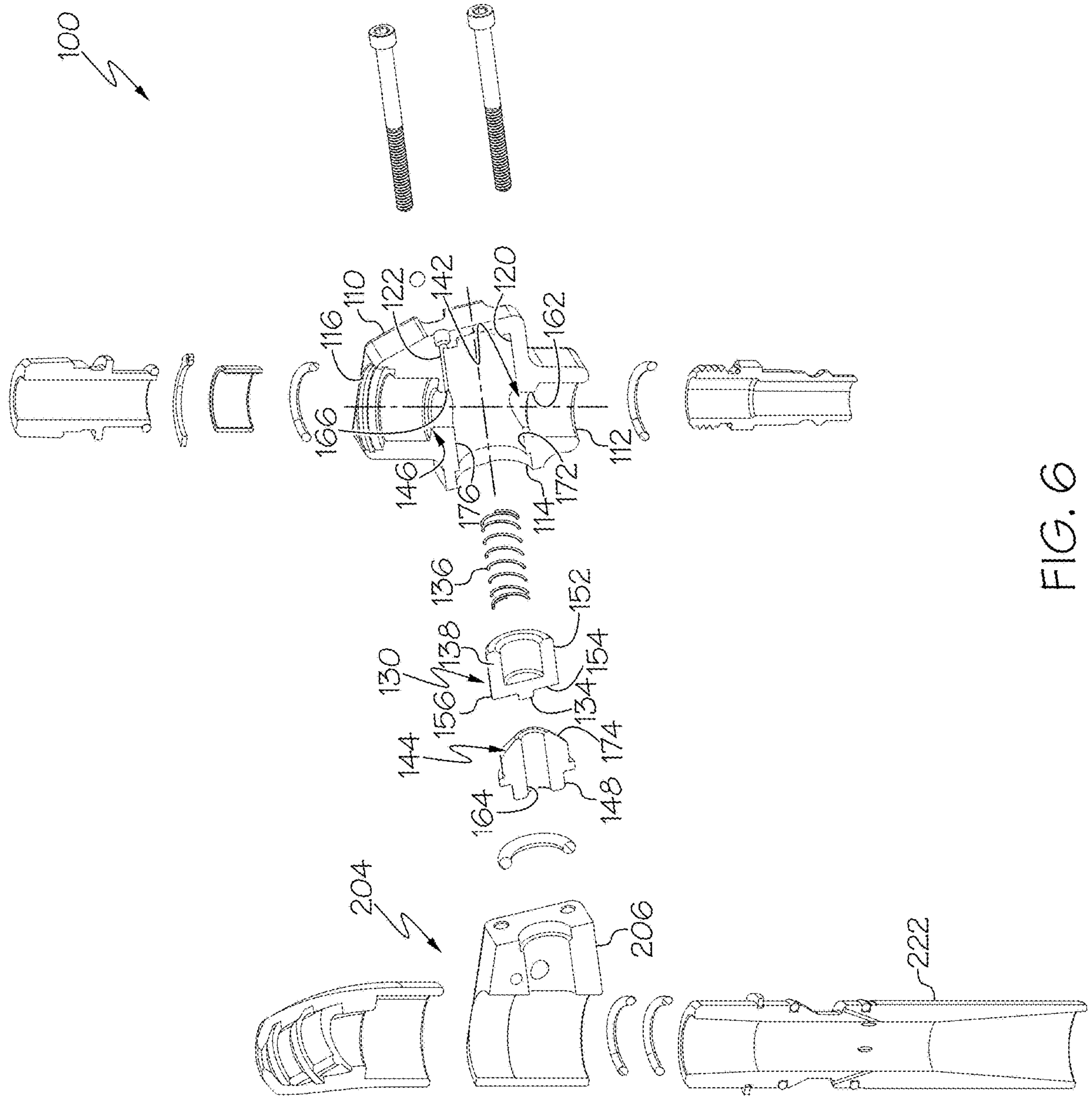
FIG. 6 is a schematic, exploded, sectional view of an example of the pneumatic valve.
Figure 7:
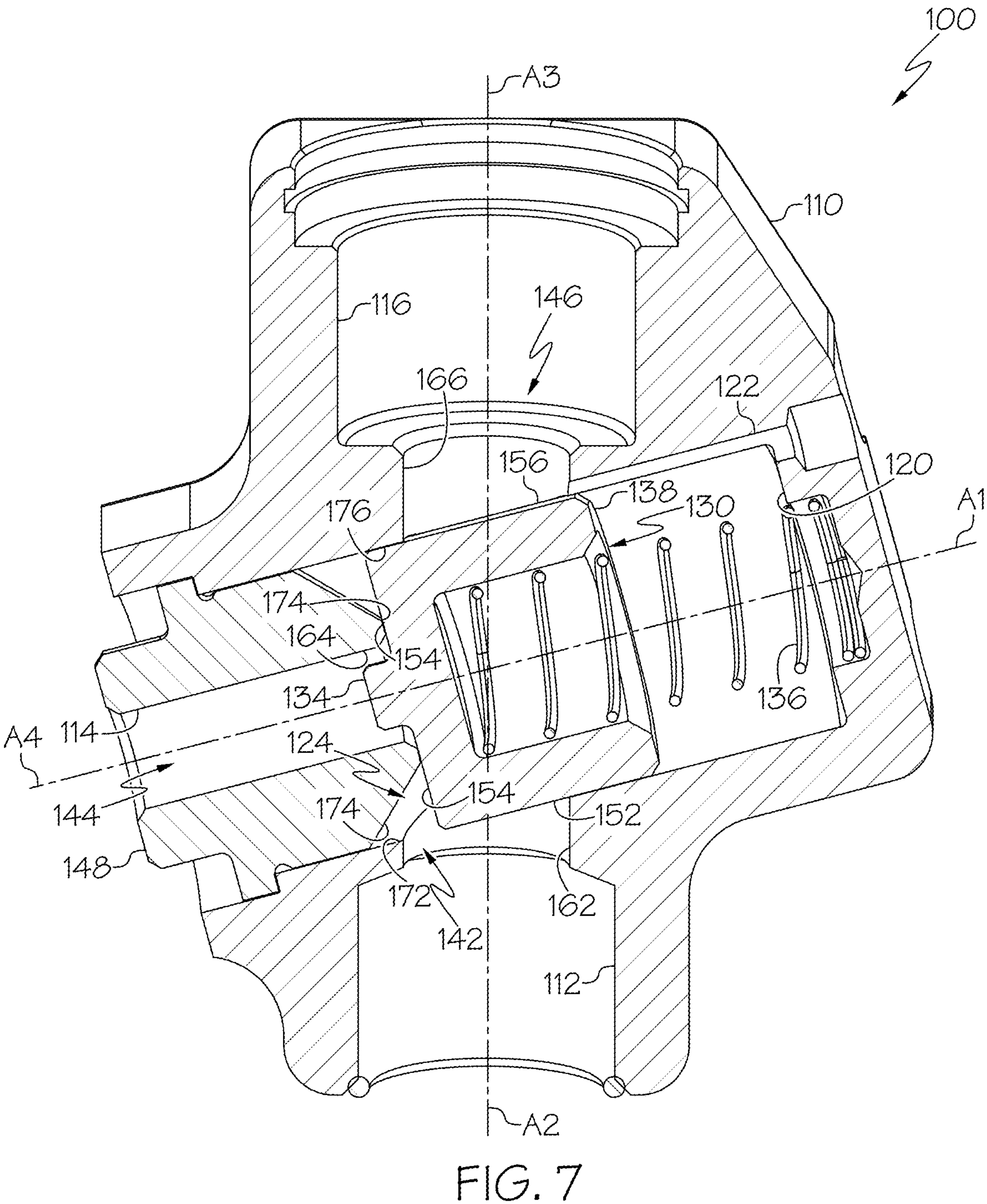
FIG. 7 is a schematic, sectional view of an example of the pneumatic valve in a closed position.
Figure 8:
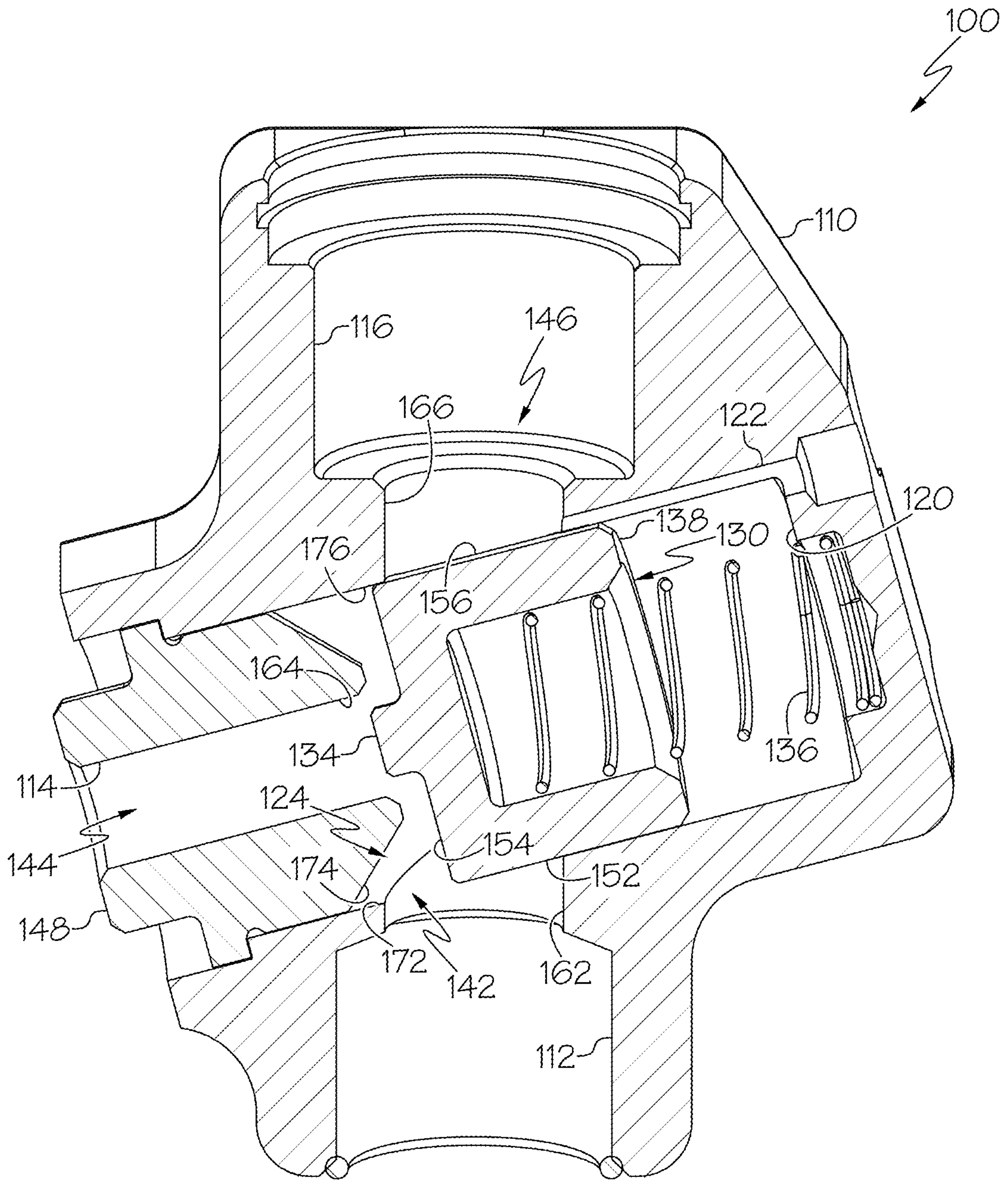
FIG. 8 is a schematic, sectional view of an example of the pneumatic valve in an accessory open position.
Figure 9:
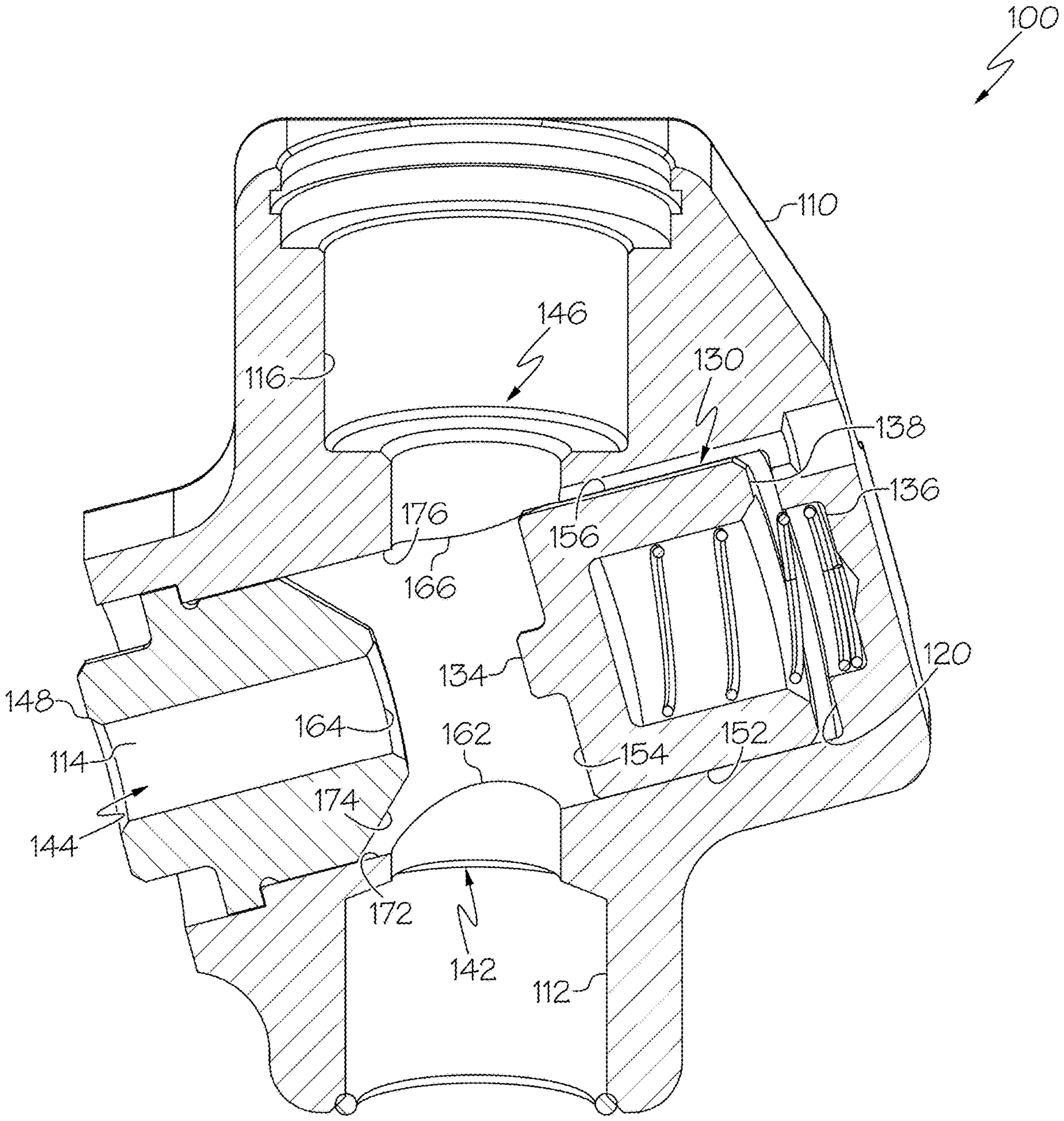
FIG. 9 is a schematic, sectional view of an example of the pneumatic valve in a tool open position.
Figure 10:
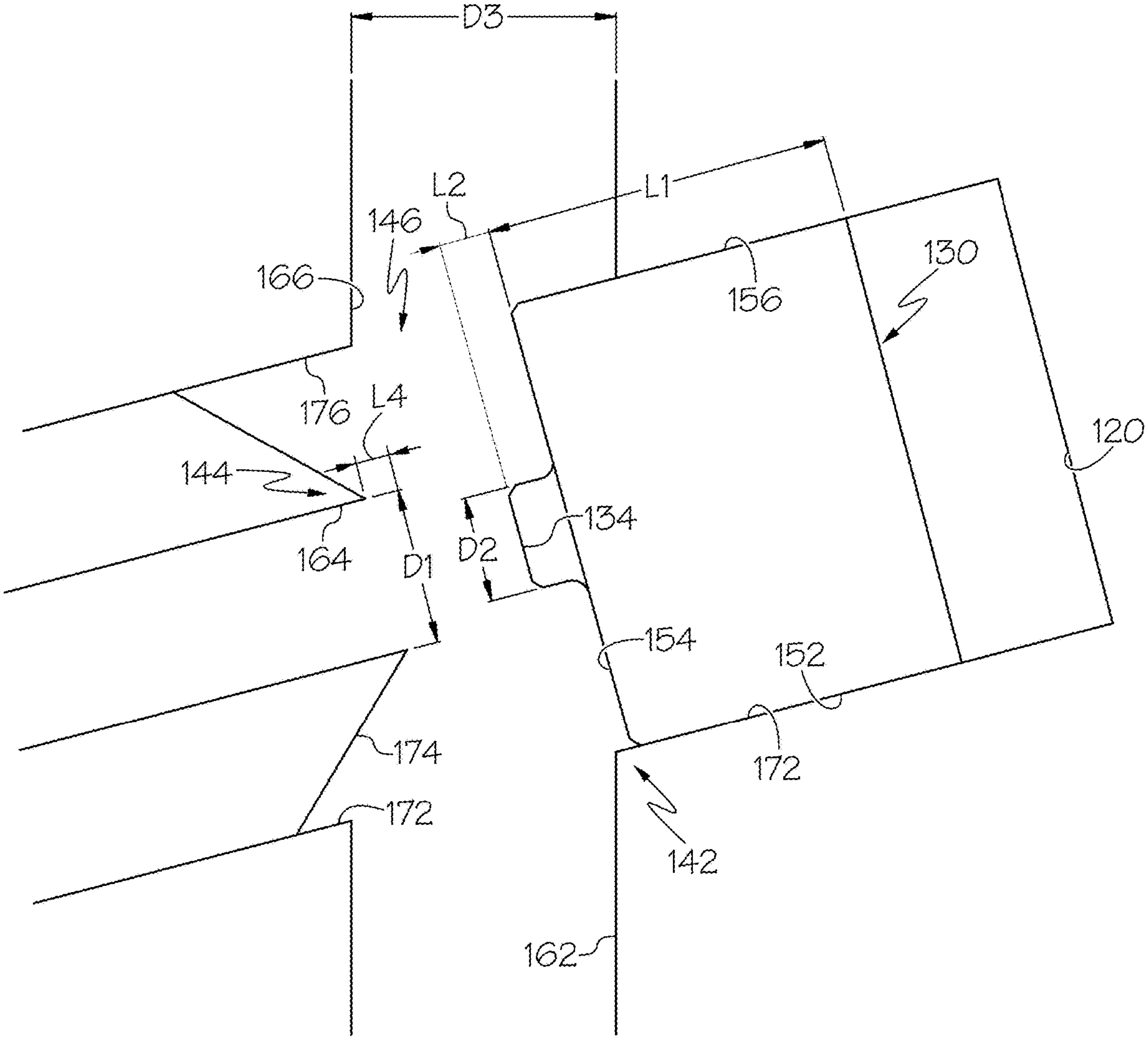
FIG. 10 is a schematic, sectional view of an example of the pneumatic valve.
Figure 11:
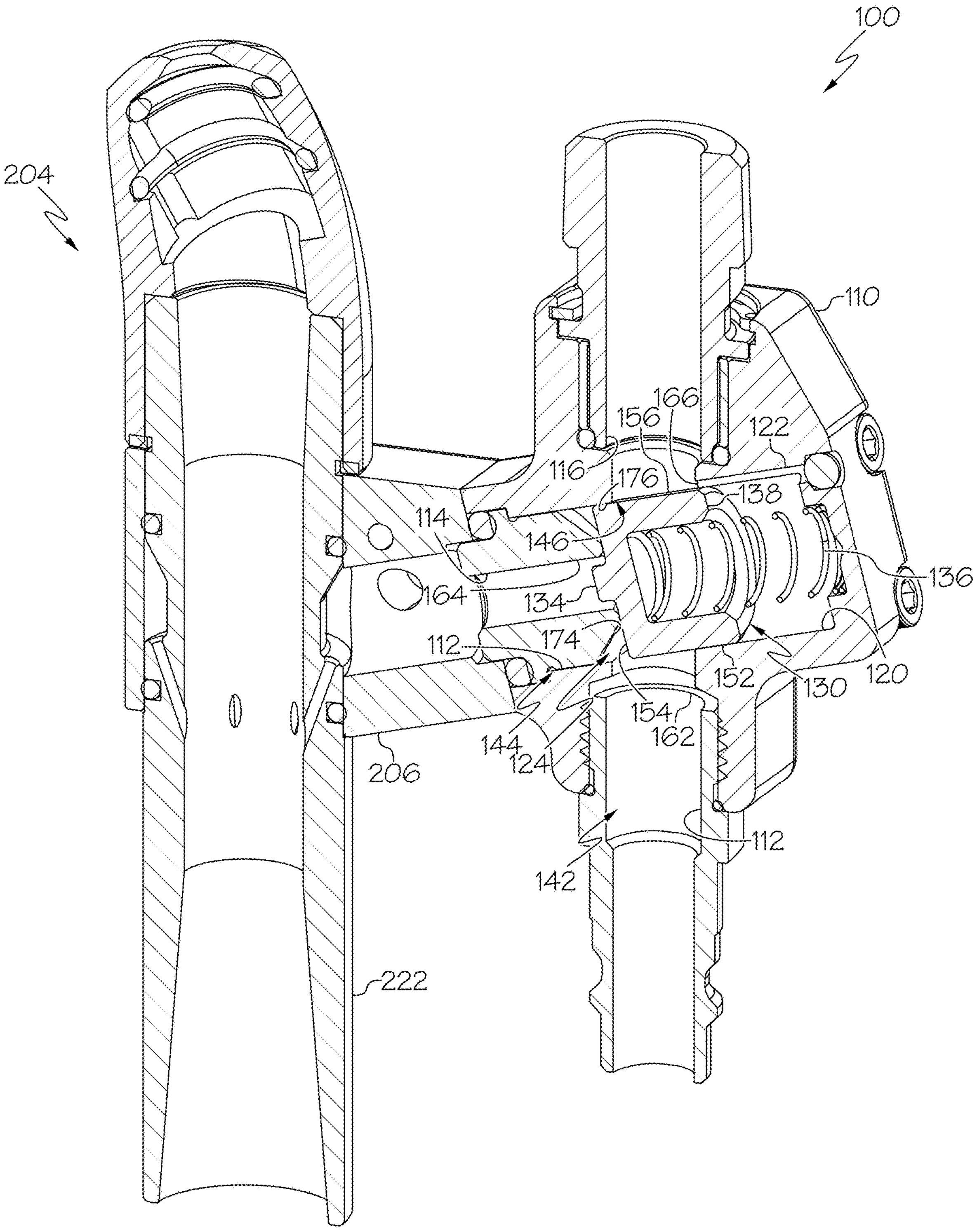
FIG. 11 is a schematic, sectional view of an example of the pneumatic valve.
Figure 12:
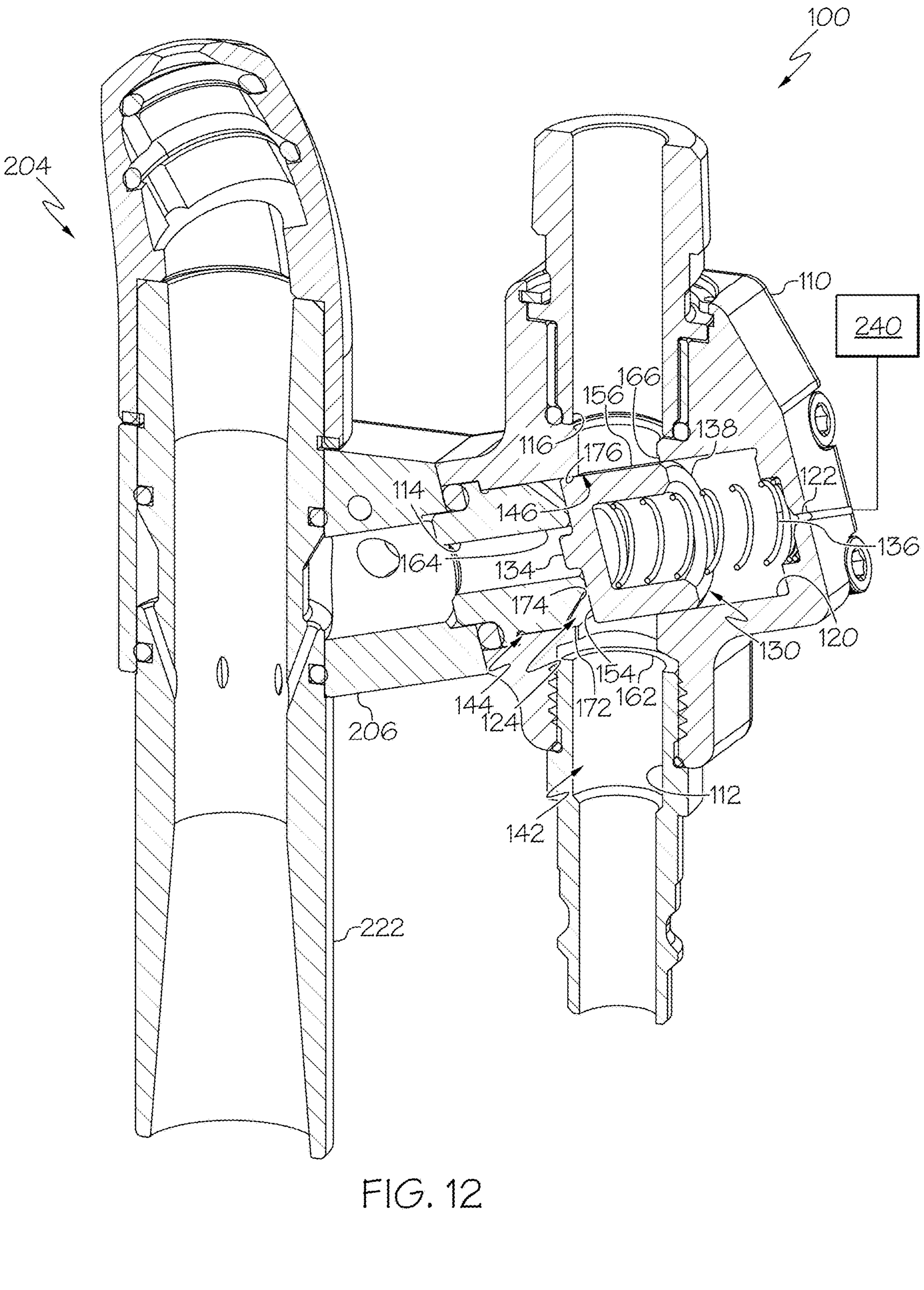
FIG. 12 is a schematic, sectional view of an example of the pneumatic valve.
Figure 13:
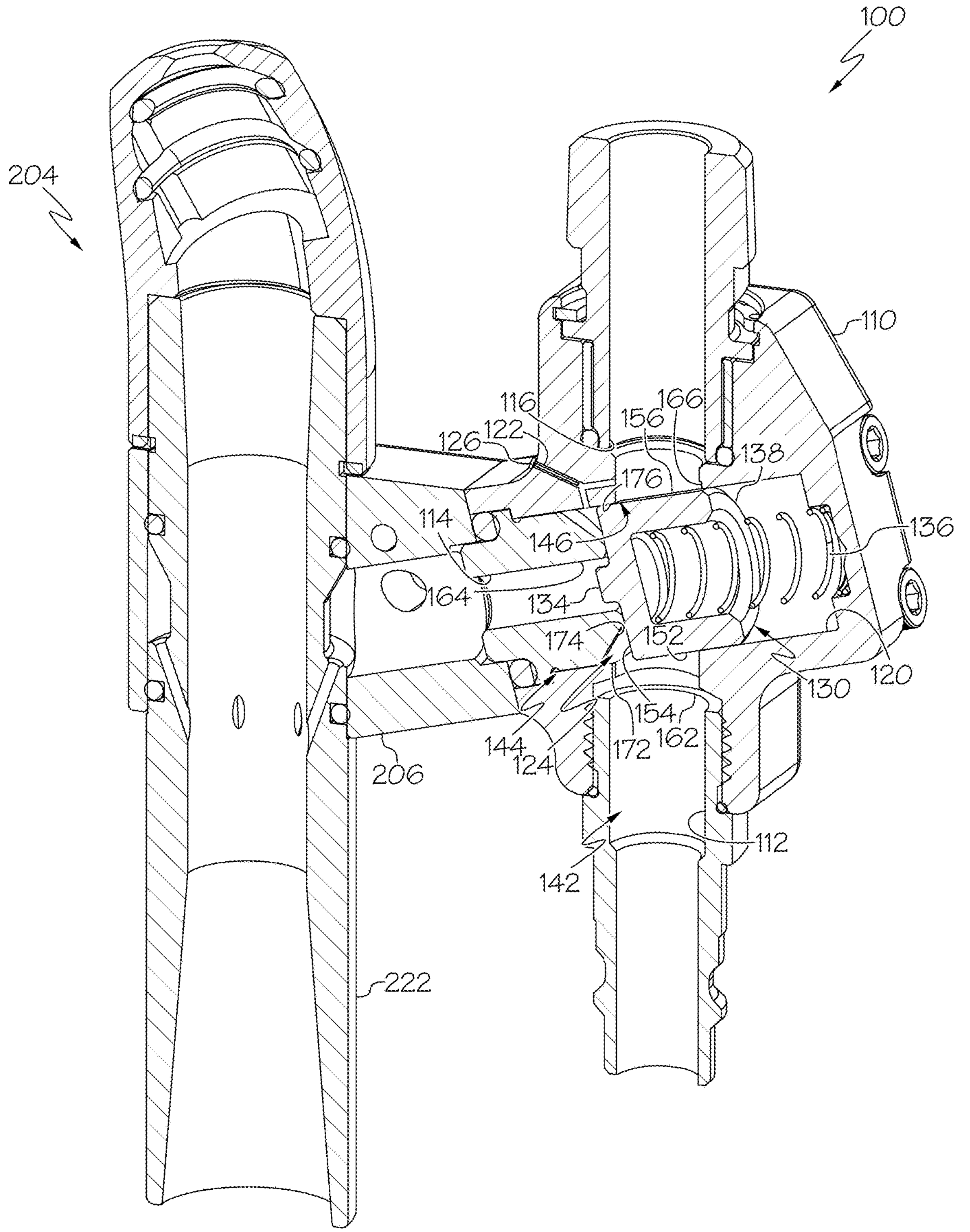
FIG. 13 is a schematic, sectional view of an example of a portion of the pneumatic valve.

FIG. 1 is a block diagram illustrating a number of components of various examples of the pneumatic valve 100. FIG. 6 is an exploded view of an example of the pneumatic valve 100. FIGS. 7-9 are sectional views of an example of the pneumatic valve 100 in various operational positions. FIG. 10 is a sectional view of a portion of the pneumatic valve 100, including an inlet port 112, an accessory port 114, a tool port 116, a valve chamber 120, and a valve plug 130. FIGS. 11-13 are sectional views of various examples of the pneumatic valve 100.

As illustrated in FIGS. 1 and 6-13, in one or more examples, the pneumatic valve 100 includes a valve body 110, the valve chamber 120, the inlet port 112, the tool port 116, the accessory port 114, and the valve plug 130. The inlet port 112 is formed through the valve body 110 and is configured for connection to and fluid communication with a pneumatic source 208 or other supply of compressed air. The tool port 116 is formed through the valve body 110 and is configured for connection to and fluid communication with the pneumatic tool 202. The accessory port 114 is formed through the valve body 110 and is configured for connection to and fluid communication with the pneumatic accessory 204.

The valve plug 130 is situated in the valve chamber 120. The valve plug 130 is movable within the valve chamber 120 and relative to the inlet port 112, accessory port 114, and tool port 116. Movement of the valve plug 130 in the valve chamber 120 selectively opens and closes a pneumatic flow between the inlet port 112, the accessory port 114, and the tool port 116 in response to relative pressure differential between the valve chamber 120 and the inlet port 112.

Generally, the valve plug 130 serves as the valve mechanism, which acts as a spool valve for the pneumatic tool 202 and acts as a poppet valve for the pneumatic accessory 204. The pneumatic valve 100 is internally ported to sense demand from the pneumatic tool 202, rather than using an external source. The pneumatic valve 100 is configured such that pneumatic flow to the pneumatic accessory 204 is fully opened prior to opening pneumatic flow to the pneumatic tool 202 and that pneumatic flow to both the pneumatic tool 202 and the pneumatic accessory 204 closes after demand from the pneumatic tool 202 ceases.

As illustrated in FIGS. 7-13, the valve chamber 120 is formed by the valve body 110. In one or more examples, the valve chamber 120 is cylindrical. The inlet port 112 is configured for fluid communication with the valve chamber 120 and selective communication with the accessory port 114 and the tool port 116 via the valve chamber 120. The tool port 116 is configured for selective fluid communication with the valve chamber 120 and the inlet port 112 via the valve chamber 120. The accessory port 114 is configured for selective fluid communication with the valve chamber 120 and the inlet port 112 via the valve chamber 120.

FIGS. 7-9, illustrate examples of the pneumatic valve 100 in a closed position (FIG. 7), an accessory open position (FIG. 8), and a tool open position (FIG. 9). In one or more examples, the valve plug 130 is movable between the closed position, the accessory open position, and the tool open position. The closed position is configured for restricting pneumatic flow from the inlet port 112 to the accessory port 114 and the tool port 116. The accessory open position is configured for allowing pneumatic flow from the inlet port 112 to the accessory port 114 while restricting the pneumatic flow from the inlet port 112 to the tool port 116. The tool open position is configured for allowing pneumatic flow from the inlet port 112 to the accessory port 114 and to the tool port 116.

In one or more examples, the valve plug 130 moves from the closed position (FIG. 7) to the accessory open position (FIG. 8) in response to a pressure reduction in the valve chamber 120 relative to the inlet port 112. The valve plug 130 moves from the accessory open position (FIG. 8) to the tool open position (FIG. 9) in response to the pressure reduction in the valve chamber 120 relative to the inlet port 112. The valve plug 130 moves from the tool open position (FIG. 9) back to the closed position (FIG. 7) in response to a pressure equalization in the valve chamber 120 relative to the inlet port 112.

In one or more examples, the valve plug 130 is biased in the closed position. In one or more examples, the pneumatic valve 100 includes a biasing element 136, such as a spring. The biasing element 136 is located in the valve chamber 120 between the valve plug 130 and the valve body 110. Upon demand for pneumatic flow to the pneumatic tool 202 and, thus, upon a pressure reduction in a portion of the valve chamber 120 behind the valve plug 130, the pressure in a portion of the valve chamber 120 in front of the valve plug 130 exerts a force on a portion of the valve plug 130 (e.g., accessory valve surface 154) that overcomes a biasing force of the biasing element 136. Upon an equalization in pressure between the inlet port 112 and the valve chamber 120, the biasing force of the biasing element 136 returns the valve plug 130 to the closed position.

As illustrated in FIG. 7, in one or more examples, the valve chamber 120 has a longitudinal axis A1. The valve plug 130 is movable (e.g., translates) along the longitudinal axis A1 to selectively open and close pneumatic flow between the inlet port 112, the accessory port 114, and the tool port 116 in response to the relative pressure differential between the valve chamber 120 and the inlet port 112. In one or more examples, the inlet port 112 has an inlet-port axis A2 that is non-parallel and non-perpendicular to the longitudinal axis A1. The tool port 116 has a tool-port axis A3 that is non-parallel and non-perpendicular to the longitudinal axis A1. The inlet-port axis A2 and the tool-port axis A3 are parallel to or coincident (e.g., co-axial) with each other. The accessory port 114 has an accessory-port axis A4 that is parallel to or coincident with the longitudinal axis A1.

In one or more examples, the valve chamber 120 (e.g., longitudinal axis A1 of the valve chamber 120) is oriented at an angle of between approximately 15 degrees and 45 degrees relative to the inlet port 112 (inlet-port axis A2) and the tool port 116 (tool-port axis A3). Similarly, the accessory port 114 (accessory-port axis A4) is oriented at an angle of between approximately 15 degrees and 45 degrees relative to the inlet port 112 (inlet-port axis A2) and the tool port 116 (tool-port axis A3). The angle (e.g., tilt) of the longitudinal axis A1 and the accessory-port axis A4 relative to the inlet-port axis A2 and the tool-port axis A3 serves a number of functions, including: maintaining fluid communication between the inlet port 112 and the valve chamber 120 when the valve plug 130 is in the closed position; facilitating a force (pressure) acting on the valve plug 130 to move the valve plug 130 from the closed position to the accessory open position and then from the accessory open position to the tool open position in response to demand from the pneumatic tool 202 (pressure drop in the valve chamber 120) and momentum of airflow from the inlet port 112 to the tool port 116; fully opening the accessory port 114 (e.g., full pneumatic flow from the inlet port 112 to the accessory port 114) before opening the tool port 116 (e.g., pneumatic flow from the inlet port 112 to the tool port 116); and fully closing the tool port 116 (e.g., pneumatic flow from the inlet port 112 to the tool port 116) before closing the accessory port 114 (e.g., full pneumatic flow from the inlet port 112 to the accessory port 114)

As illustrated in FIGS. 1 and 6-13, in one or more examples, the pneumatic valve 100 includes in inlet valve seat 142, an accessory valve seat 144, and a tool valve seat 146. The valve plug 130 is configured to selective contact the inlet valve seat 142, the accessory valve seat 144, and the tool valve seat 146 to open and close the inlet port 112, the accessory port 114, and the tool port 116.

The inlet valve seat 142 is situated between the valve chamber 120 and the inlet port 112. The inlet valve seat 142 includes an inlet seat surface 172. The inlet seat surface 172 forms, defines, or otherwise surrounds an inlet orifice 162 (e.g., bore) of the inlet port 112. In one or more examples, the inlet valve seat 142 (e.g., at least the inlet seat surface 172) is formed by an interior of the valve body 110, for example, forming a portion of the valve chamber 120. As an example, the inlet valve seat 142 or the inlet seat surface 172 serves as a spool valve seat and is formed by at least an edge of an inlet bore (e.g., inlet orifice 162).

The accessory valve seat 144 is situated between the valve chamber 120 and the accessory port 114. The accessory valve seat 144 includes an accessory seat surface 174. The accessory seat surface 174 forms, defines, or otherwise surrounds an accessory orifice 164 (e.g., bore) of the accessory port 114. In one or more examples, as illustrated, the accessory valve seat 144 includes or is formed by a seat body 148 having a tubular shape and located within the valve body 110 at the accessory port 114. In these examples, the seat body 148 forms the accessory seat surface 174. In one or more examples, the accessory valve seat 144 (e.g., at least the accessory seat surface 174) is formed by an interior of the valve body 110, for example, forming a portion of the valve chamber 120. As an example, the accessory valve seat 144 or the accessory seat surface 174 serves as a poppet valve seat and is formed by at least an edge of an outlet bore (e.g., accessory orifice 164).

The tool valve seat 146 is situated between the valve chamber 120 and the tool port 116. The tool valve seat 146 includes a tool seat surface 176. The tool seat surface 176 forms, defines, or otherwise surrounds a tool orifice 166

(e.g., bore) of the accessory port 114. In one or more examples, the tool valve seat 146 (e.g., at least the tool seat surface 176) is formed by an interior of the valve body 110, for example, forming a portion of the valve chamber 120. As an example, the tool valve seat 146 or the tool seat surface 176 serves as a spool valve seat and is formed by at least an edge of an outlet bore (e.g., tool orifice 166).

In one or more examples, the valve plug 130 includes an inlet valve surface 152, an accessory valve surface 154, and a tool valve surface 156. In one or more examples, the valve plug 130 includes a plug body 138 that has a cylindrical shape and that is suitably sized to be in contact with the interior bore surface of the valve body 110 forming the valve chamber 120. In one or more examples, the plug body 138 forms the sealing surfaces of the valve plug 130, including the inlet valve surface 152, the accessory valve surface 154, and the tool valve surface 156.

The inlet valve surface 152 is configured for engaging the inlet seat surface 172 of the inlet valve seat 142. In one or more examples, the inlet valve surface 152 is generally parallel to the inlet seat surface 172 and is at a non-parallel and non-perpendicular angle (e.g., 15 to 45 degrees) relative to the inlet-port axis A2. In one or more examples, the inlet valve surface 152 is curved or is formed by a portion of a circumferential surface of the plug body 138. The inlet valve surface 152 slides along the inlet seat surface 172 during movement of the valve plug 130 to cover and uncover the inlet orifice 162 and open and close (at least partially) the inlet port 112. In one or more examples, the inlet valve surface 152 is configured (e.g., sized and/or shaped) such that a portion of the inlet orifice 162 is uncovered (e.g., open) and the inlet port 112 is in fluid communication with the space 124 (e.g., portion of the valve chamber 120) ahead of the valve plug 130 when the valve plug 130 is in the closed position.

The accessory valve surface 154 is configured for engaging the accessory valve seat 144 (e.g., in the closed position). In one or more examples, the accessory valve surface 154 is generally parallel to the accessory seat surface 174 and is at perpendicular angle relative to the accessory-port axis A4. In one or more examples, the accessory valve surface 154 is flat (e.g., planar) or is formed by a portion of an end surface of the plug body 138. The accessory valve surface 154 moves away and toward the accessory seat surface 174 during movement of the valve plug 130 to cover and uncover the accessory orifice 164 and open and close the accessory port 114.

The tool valve surface 156 is configured for engaging the tool valve seat 146 (e.g., in the closed position and the accessory open position). In one or more examples, the tool valve surface 156 is generally parallel to the tool seat surface 176 and is at a non-parallel and non-perpendicular angle (e.g., 15 to 45 degrees) relative to the tool-port axis A3. In one or more examples, the tool valve surface 156 is curved or is formed by a portion of a circumferential surface of the plug body 138. The tool valve surface 156 slides along the tool seat surface 176 during movement of the valve plug 130 to cover and uncover the tool orifice 166 and open and close (at least partially) the tool port 116. In one or more examples, the tool valve surface 156 is configured (e.g., sized and/or shaped) such the tool orifice 166 is covered (e.g., closed) when the valve plug 130 is in the closed position.

As illustrated in FIGS. 7-9, in one or more examples, the accessory valve seat 144 is tapered such that a space 124 (FIG. 7) is formed between the accessory valve seat 144 and the valve plug 130 in the closed position. In one or more examples, a portion of the accessory seat surface 174 is tapered or inwardly angled (e.g., the accessory valve seat 144 reduces in diameter) along the accessory-port axis A4 in a direction toward the valve plug 130. In these examples, the space 124 is formed between the accessory seat surface 174 and the accessory valve surface 154 when the valve plug 130 is in the closed position. In other examples, the accessory seat surface 174 is planar (flat) and a portion of the accessory valve surface 154 is tapered or inwardly angled (e.g., the plug body 138 reduces in diameter) along the longitudinal axis A1 in a direction toward the accessory valve seat 144 to form the space 124 between the accessory seat surface 174 and the accessory valve surface 154 when the valve plug 130 is in the closed position.

As illustrated in FIGS. 7-9, in one or more examples, the valve plug 130 includes a protrusion 134. The protrusion 134 projects or extends from the plug body 138. In one or more examples, the protrusion 134 projects outwardly from the accessory valve surface 154. In one or more examples, an entirety of the protrusion 134 is situated in the accessory orifice 164 when the valve plug 130 is in the closed position (FIG. 7). In one or more examples, a portion of the protrusion 134 is situated in the accessory orifice 164 when the valve plug 130 is in the accessory open position (FIG. 8). In one or more examples, an entirety of the protrusion 134 is situated outside of the accessory orifice 164 in the tool open position (FIG. 9).

In one or more examples, the protrusion 134 assists in directing the path of pneumatic flow into the accessory orifice 164 as the valve plug 130 moves from the closed position toward the accessory open position. In one or more examples, the protrusion 134 helps position the pneumatic valve 100 in the accessory-open position (FIG. 8). In one or more examples, and without being bound to a particular theory, it has been discovered that when decreasing the biasing (e.g., spring) force, the change in direction of the pneumatic flow into the accessory port 114 is sufficient to keep the pneumatic valve 100 in the accessory open position without demand from the pneumatic tool 202, especially with high demand pneumatic accessories. In one or more examples, including the protrusion 134 creates a small restriction or disturbance and, thus, a small force that pulls the protrusion 134 into the accessory orifice 164. In one or more examples, and without being bound to a particular theory, some amount of momentum can be at play when the pneumatic flow turns a corner from the inlet port 112 to the accessory port 114, and this can become more impactful as demand from the pneumatic accessory 204 increases and the valve plug 130 can remain in the accessory open position when there is no for pneumatic flow to the pneumatic tool 202. In these examples, the protrusion 134 slightly reduces the pneumatic flow into the accessory port 114, which creates a small pressure differential on the surface of the plug face (e.g., accessory valve surface 154) and provides additional bias force to close the pneumatic valve 100 (e.g., bias the valve plug 130 back to the closed position). At lower levels of pneumatic flow to the pneumatic accessory 204, the differential at the small area formed by the protrusion 134 is not as much, but it is not required, since there is much less air turning the corner.

Referring to FIGS. 1 and 10, in one or more examples, the accessory orifice 164 has an accessory-orifice diameter D1 (e.g., cross sectional dimension). The protrusion 134 has a protrusion diameter D2 (e.g., cross sectional dimension). The protrusion diameter D2 is at least one-half of the accessory-orifice diameter D1. The protrusion diameter D2 being at least one-half of the accessory-orifice diameter D1 facilitates flow into the accessory orifice 164 as the valve plug 130 moves away from the accessory valve seat 144 and/or provides an additional biasing force to move the valve plug 130 toward the accessory valve seat 144. In other examples, the protrusion diameter D2 is approximately one-half of the accessory-orifice diameter D1. In yet other examples, the protrusion diameter D2 is less that one-half of the accessory-orifice diameter D1.

Referring to FIG. 10, in one or more examples, the tool orifice 166 has a tool-orifice diameter D3 (e.g., cross sectional dimension). The tool valve surface 156 has a tool valve-surface length L1. The protrusion 134 has a protrusion length L2. Generally, the tool valve-surface length L1 is greater than the tool-orifice diameter D3. In one or more examples, the protrusion length L2 is less than a difference between the tool valve-surface length L1 and the tool-orifice diameter D3. In one or more examples, the protrusion length L2 is approximately equal to a longitudinal distance L4 between an end of the accessory seat surface 174 and the edge of the tool orifice 166. In one or more examples, the longitudinal distance L4 is to the linear distance the valve plug 130 moves (e.g., slides) from the closed position to the accessory open position, just before the tool port 116 is opened. The relationship between the protrusion length L2, the tool valve-surface length L1, the tool-orifice diameter D3, and the longitudinal distance L4 enable the valve plug 130 to keep the tool orifice 166 covered and the tool port 116 closed when the valve plug 130 is in the accessory open position. Other dimensional relationships are also contemplated.

Referring to FIGS. 1 and 11-13, in one or more examples, the pneumatic valve 100 includes a passage 122. The passage 122 is formed in the valve body 110. The passage 122 is in fluid communication with the valve chamber 120. In one or more examples, the passage 122 is also in selective fluid communication with the tool port 116. In one or more examples, the pressure reduction in the portion of the valve chamber 120 behind the valve plug 130 relative to the inlet port 112 is in response to relieving pressure at the tool port 116. In one or more examples, the pressure reduction in the portion of the valve chamber 120 behind the valve plug 130 relative to the inlet port 112 is in response to relieving pressure in the portion of the valve chamber 120 behind the valve plug 130.

Referring to FIG. 11, in one or more examples, the passage 122 is formed in the valve body 110. The passage 122 is in fluid communication with the tool port 116. The passage 122 is in selective fluid communication with the valve chamber 120 when the valve plug 130 is in the closed position and in the accessory open position. The passage 122 is not in fluid communication with the valve chamber 120 when the valve plug 130 is fully in the tool open position. In these examples, pressure reduction in the portion of the valve chamber 120 behind the valve plug 130 relative to the inlet port 112 and the portion of the valve chamber 120 in front of the valve plug 130 (e.g., space 124) is in response to demand for pneumatic flow by the pneumatic tool 202 at the tool port 116, thereby releasing pressure in the portion of valve chamber 120 behind the valve plug 130 via the passage 122 and through tool port 116 when the valve plug 130 is in the closed position and the accessory open position. Upon cessation of the demand for pneumatic flow by the pneumatic tool 202, the pressure at the inlet port 112, the tool port 116, and in the valve chamber 120 equalize and the valve plug 130 returns to the closed position.

Referring to FIG. 12, in one or more examples, the passage 122 is formed in the valve body 110. The passage 122 is in fluid communication with the valve chamber 120. The passage 122 is selectively opened and closed by an actuator 240, such as an actuation valve coupled to or actuated by the nose piece 218. In these examples, pressure reduction in the portion of the valve chamber 120 behind the valve plug 130 relative to the inlet port 112 and the portion of the valve chamber 120 in front of the valve plug 130 (e.g., space 124) is in response to actuation of the actuator 240, such as by pressing the nose piece 218 against a work surface, thereby releasing pressure in the portion of valve chamber 120 via the passage 122 when the valve plug 130 is in the closed position and the accessory open position. Upon cessation of the demand for pneumatic flow by the pneumatic tool 202, the pressure at the inlet port 112, the tool port 116, and in the valve chamber 120 equalize and the valve plug 130 returns to the closed position.

Referring to FIG. 13, in one or more examples, the passage 122 is formed in the valve body 110. The passage 122 is in selective fluid communication with the valve chamber 120 and the tool port 116. As an example, the passage 122 fluidly connects the portion of the valve chamber 120 in front of the valve plug 130 (e.g., space 124) and the tool port 116. In these examples, the pneumatic valve 100 includes a restrictor 126, such as a restrictor valve or control valve (e.g., thumb screw), that regulates pneumatic flow from the inlet port 112 to the tool port 116 via the portion of the valve chamber 120 in front of the valve plug 130 (e.g., space 124) and the passage 122. In one or more examples, the restrictor 126 sets or limits the pressure of the pneumatic flow passing through the passage 122, thereby enabling pneumatic flow at the set pressure to pass to the pneumatic tool 202 while keeping the valve plug 130 in the closed position to restrict pneumatic flow to the pneumatic accessory 204. In these examples, demand for pneumatic flow by the pneumatic tool 202 greater than the set pressure creates a pressure drop at the tool port 116. The pressure reduction in the portion of the valve chamber 120 behind the valve plug 130 relative to the inlet port 112 and the portion of the valve chamber 120 in front of the valve plug 130 (e.g., space 124) is in response to the pressure drop, thereby releasing pressure in the portion of valve chamber 120 via the passage 122 when the valve plug 130 is in the closed position and the accessory open position. Upon cessation of the demand for pneumatic flow by the pneumatic tool 202, the pressure at the inlet port 112, the tool port 116, and in the valve chamber 120 equalize and the valve plug 130 returns to the closed position.

Referring now to FIGS. 1 and 3-13, the following are examples of the pneumatic apparatus 200, according to the present disclosure. Examples of the pneumatic apparatus 200 include a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

In one or more examples, the pneumatic apparatus 200 includes the pneumatic valve 100, the pneumatic tool 202, and the pneumatic accessory 204. The pneumatic valve 100 includes the valve body 110. The valve body 110 includes the valve chamber 120 having the longitudinal axis. The inlet port 112 is formed through the valve body 110 non-parallel to the longitudinal axis. The tool port 116 is formed through the valve body 110 non-parallel to the longitudinal axis. The accessory port 114 is formed through the valve body 110 parallel to the longitudinal axis. The valve plug 130 situated in the valve chamber 120 and is movable along the longitudinal axis to selectively open and close a pneumatic flow between the inlet port 112, the accessory port 114, and the tool port 116 in response to relative pressure between the valve chamber 120 and the inlet port 112. The pneumatic tool 202 is coupled to the tool port 116 of the pneumatic valve 100. The pneumatic accessory 204 is coupled to the accessory port 114 of the pneumatic valve 100.

In one or more examples, the valve plug 130 is movable between the closed position, the accessory position, and the tool position. The closed position is configured for restricting the pneumatic flow from the inlet port 112 to the pneumatic tool 202 via the accessory port 114 and to the pneumatic tool 202 via the tool port 116. The accessory open position is configured for allowing the pneumatic flow from the inlet port 112 to the pneumatic accessory 204 via the accessory port 114 while restricting the pneumatic flow from the inlet port 112 to the pneumatic tool 202 via the tool port 116. The tool open position is configured for allowing the pneumatic flow from the inlet port 112 to the pneumatic accessory 204 via the accessory port 114 and to the pneumatic tool 202 via the tool port 116.

Figure 2:
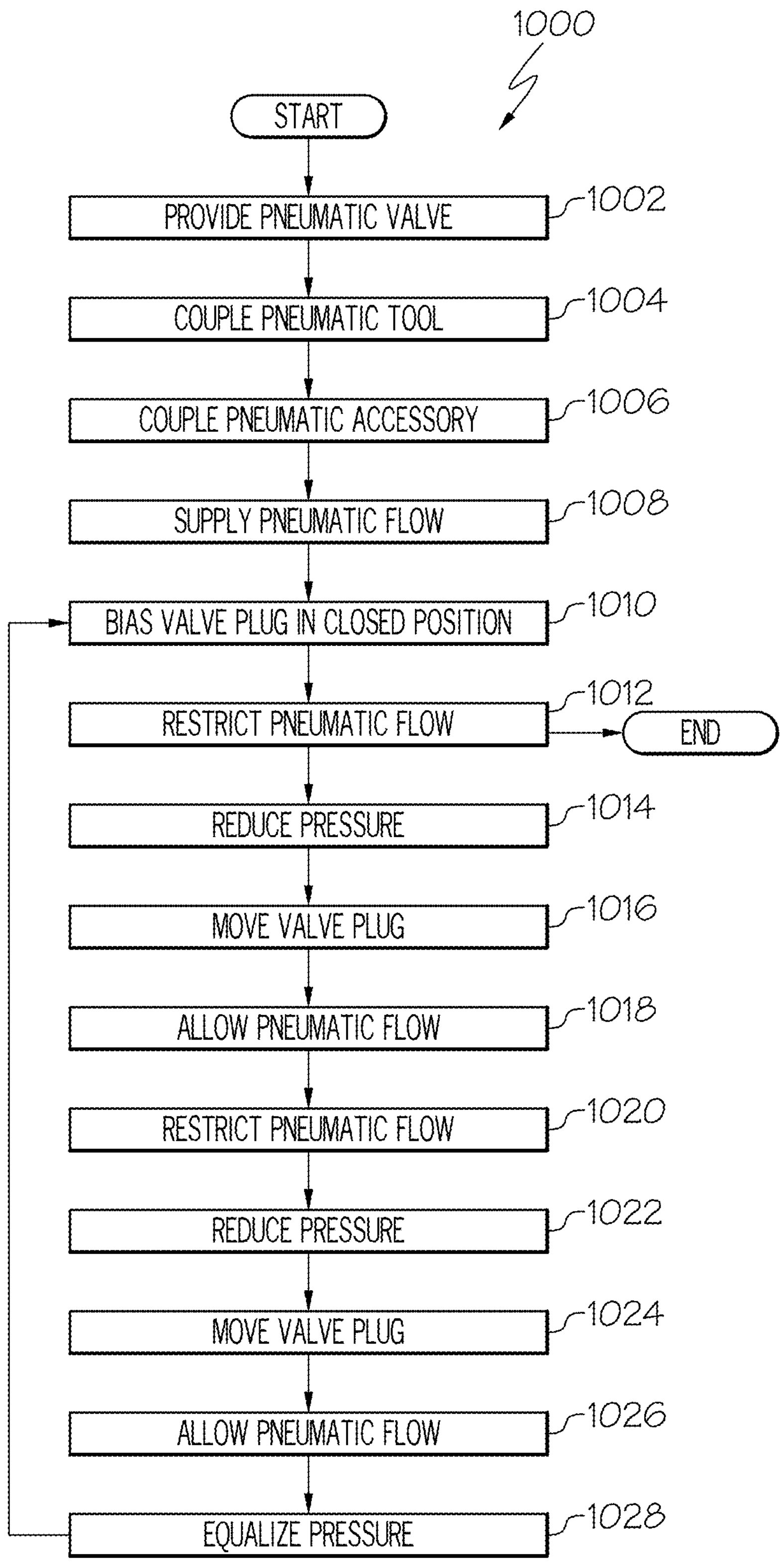
FIG. 2 is a flow diagram of an example of a method for controlling a pneumatic flow.

Referring now to FIG. 2, the following are examples of the method 1000, according to the present disclosure. In one or more examples, the method 1000 is implemented using the pneumatic valve 100 and/or the pneumatic apparatus 200 (FIG. 1). Examples of the method 1000 include a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

In one or more examples, the method 1000 includes a step of providing 1002 the pneumatic valve 100. The valve body 110 includes the valve chamber 120 having the longitudinal axis. The inlet port 112 is formed through the valve body 110 non-parallel to the longitudinal axis. The tool port 116 is formed through the valve body 110 non-parallel to the longitudinal axis. The accessory port 114 is formed through the valve body 110 parallel to the longitudinal axis. The valve plug 130 is situated in the valve chamber 120.

In one or more examples, the method 1000 includes a step of coupling 1004 the pneumatic tool 202 to the tool port 116. The method 1000 includes a step of coupling 1006 the pneumatic accessory 204 to the accessory port 114. The method 1000 includes a step of supplying 1008 a pneumatic flow to the inlet port 112.

In one or more examples, the method 1000 includes a step of biasing 1010 the valve plug 130 in the closed position. With the valve plug 130 in the closed position, the method 1000 includes a step of restricting 1012 pneumatic flow from the inlet port 112 to the accessory port 114 and the tool port 116 and, thus, the pneumatic accessory 204 and the pneumatic tool 202.

With the valve plug 130 in the closed position, the method 1000 includes a step of reducing 1014 pressure in a portion of the valve chamber 120. As an example, pressure is reduced in the portion of the valve chamber 120 behind the valve plug 130. In one or more examples, the reduction in pressure in the valve chamber 120 is achieved by or is in response to a demand for pneumatic flow by the pneumatic tool 202 and an associated reduction in pressure at the tool port 116 passed through the passage 122. In one or more examples, the reduction in pressure in the valve chamber 120 is achieved by or is in response to actuation of the actuator 240 and is passed through the passage 122. In one or more examples, the reduction in pressure in the valve chamber 120 is achieved by or is in response to a demand for pneumatic flow by the pneumatic tool 202 being greater than a pressure set by the restrictor 126 and an associated reduction in pressure at the tool port 116 passed through the passage 122.

In one or more examples, the method 1000 includes a step of moving the valve plug 130 along the longitudinal axis to selectively open and close the pneumatic flow between the inlet port 112, the accessory port 114, and the tool port 116 in response to relative pressure differential between the valve chamber 120 and the inlet port 112. The method 1000 includes a step of moving 1016 the valve plug 130 from the closed position to the accessory open position in response to the pressure reduction in the valve chamber 120 relative to the inlet port 112. With the valve plug 130 in the accessory open position, the method 1000 includes a step of allowing 1018 pneumatic flow from the inlet port 112 to the accessory port 114 and, thus, the pneumatic accessory 204. With the valve plug 130 in the accessory open position, the method 1000 includes a step of restricting 1020 pneumatic flow from the inlet port 112 to the tool port 116 and, thus, the pneumatic tool 202.

With the valve plug 130 in the accessory position, the method 1000 includes a step of further reducing 1022 pressure (or maintaining the reduced pressure) in the portion of the valve chamber 120 behind the valve plug 130 relative to the inlet port 112 and the portion of the valve chamber 120 in front of the valve plug 130. The method 1000 includes a step of moving 1024 the valve plug 130 from the accessory open position to the tool open position in response to the pressure reduction in the valve chamber 120 relative to the inlet port 112. The method 1000 includes a step of allowing 1026 the pneumatic flow from the inlet port 112 to the accessory port 114 and to the tool port 116.

In one or more examples, the method 1000 includes a step of equalizing 1028 pressure in the pneumatic valve 100, such as at the inlet port 112, the accessory port 114, the tool port 116, and in the valve chamber 120. In one or more examples, pressure is equalized in response to cessation of demand for pneumatic flow at the tool port 116. Upon equalization of pressure, the valve plug 130 is biased back to the closed position.

Figure 14:
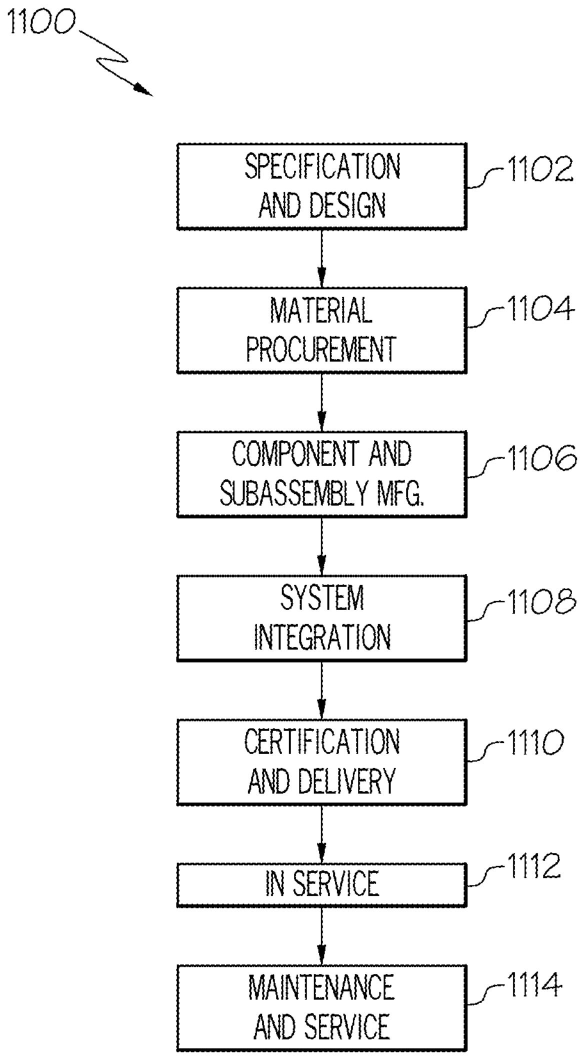
FIG. 14 is a flow diagram of an example of an aircraft manufacturing and service method.
Figure 15:
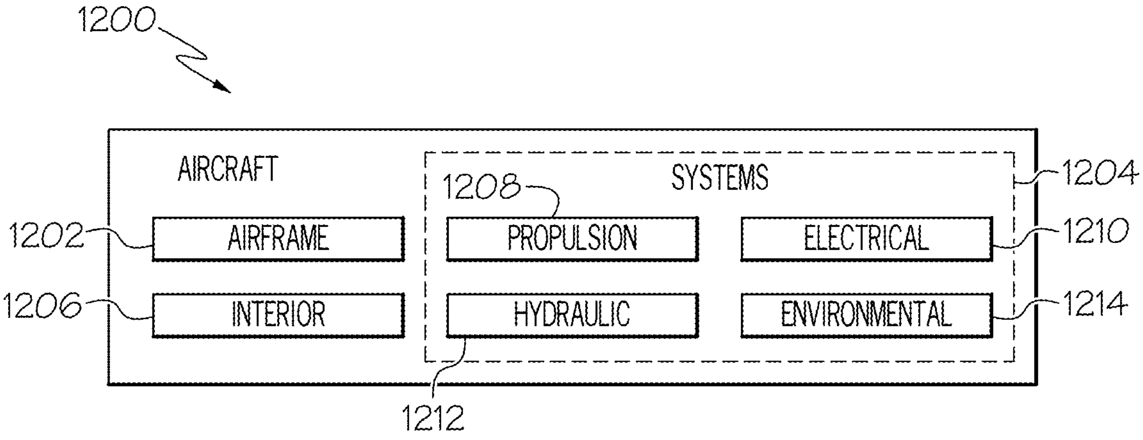
FIG. 15 is a schematic block diagram of an example of an aircraft.

Referring now to FIGS. 14 and 15, examples of the pneumatic valve 100, the pneumatic apparatus 200, and the method 1000, described herein, may be related to, or used in the context of, the aerospace manufacturing and service method 1100, as shown in the flow diagram of FIG. 10 and an aircraft 1200, as schematically illustrated in FIG. 11. As an example, the aircraft 1200 and/or the manufacturing and service method 1100 may utilize pneumatic tools and pneumatic accessories that are operated and controlled using the pneumatic valve 100 and/or according to the method 1000.

Referring to FIG. 15, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 can have any number of components that are manufactured and/or installed using pneumatic tools and pneumatic accessories, which are operated and controlled using the pneumatic valve 100 and/or according to the method 1000.

Referring to FIG. 14, during pre-production of the aircraft 1200, the manufacturing and service method 1100 includes specification and design 1102 of the aircraft 1200 and material procurement 1104. During production of the aircraft 1200, component and subassembly manufacturing 1106 and system integration 1108 of the aircraft 1200 take place. Thereafter, the aircraft 1200 goes through certification and delivery 1110 to be placed in service 1112. Routine maintenance and service 1114 includes modification, reconfiguration, refurbishment, etc. of one or more systems of the aircraft 1200.

Each of the processes of the manufacturing and service method 1100 illustrated in FIG. 14 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the pneumatic valve 100, the pneumatic apparatus 200, and the method 1000, shown and described herein, may be employed during any one or more of the stages of the manufacturing and service method 1100 shown in the flow diagram illustrated by FIG. 14. In an example, components of the aircraft 1200 can be manufactured and/or installed using pneumatic tools and pneumatic accessories, which are operated and controlled using the pneumatic valve 100 and/or according to the method 1000 during a portion of component and subassembly manufacturing 1106 and/or system integration 1108. Further, components of the aircraft 1200 can be manufactured and/or installed using pneumatic tools and pneumatic accessories, which are operated and controlled using the pneumatic valve 100 and/or according to the method 1000 while the aircraft 1200 is in service 1112. Also, components of the aircraft 1200 can be manufactured and/or installed using pneumatic tools and pneumatic accessories, which are operated and controlled using the pneumatic valve 100 and/or according to the method 1000 during system integration 1108 and certification and delivery 1110. Similarly, components of the aircraft 1200 can be manufactured and/or installed using pneumatic tools and pneumatic accessories, which are operated and controlled using the pneumatic valve 100 and/or according to the method 1000 while the aircraft 1200 is in service 1112 and during maintenance and service 1114.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term “and/or” and the “/” symbol includes any and all combinations of one or more of the associated listed items.

For the purpose of this disclosure, the terms “coupled,” “coupling,” and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term “approximately” refers to or represents a condition that is close to, but not exactly, the stated condition that still performs the desired function or achieves the desired result. As an example, the term “approximately” refers to a condition that is within an acceptable predetermined tolerance or accuracy, such as to a condition that is within 10% of the stated condition. However, the term “approximately” does not exclude a condition that is exactly the stated condition. As used herein, the term “substantially” refers to a condition that is essentially the stated condition that performs the desired function or achieves the desired result.

FIGS. 1, 3-13 and 15, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-13 and 15, referred to above, need be included in every example and not all elements, features, and/or components described herein are necessarily depicted in each illustrative example. Accordingly, some of the elements, features, and/or components described and illustrated in FIGS. 1, 3-13 and 15 may be combined in various ways without the need to include other features described and illustrated in FIGS. 1, 3-13 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-13 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-13 and 15, and such elements, features, and/or components may not be discussed in detail herein with reference to each of FIGS. 1, 3-13 and 15. Similarly, all elements, features, and/or components may not be labeled in each of FIGS. 1, 3-13 and 15, but reference numerals associated therewith may be utilized herein for consistency.

In FIGS. 2 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the pneumatic valve 100, the pneumatic apparatus 200, and the method 1000 have been shown and described, modifications may occur to those skilled in the art upon reading the specification. The present application includes such modifications and is limited only by the scope of the claims.

What is claimed is:

1. A pneumatic valve comprising:

a valve body comprising a valve chamber having a longitudinal axis;

an inlet port formed through the valve body non-parallel to the longitudinal axis;

a tool port formed through the valve body non-parallel to the longitudinal axis;

an accessory port formed through the valve body parallel to the longitudinal axis; and a valve plug situated in the valve chamber and movable along the longitudinal axis to selectively open and close a pneumatic flow between the inlet port, the accessory port, and the tool port in response to relative pressure differential between the valve chamber and the inlet port, wherein the valve plug is movable between:

a closed position for restricting the pneumatic flow from the inlet port to the accessory port and the tool port;

an accessory open position for allowing the pneumatic flow from the inlet port to the accessory port while restricting the pneumatic flow from the inlet port to the tool port; and a tool open position for allowing the pneumatic flow from the inlet port to the accessory port and to the tool port.

2. The pneumatic valve of claim 1, wherein the longitudinal axis of the valve chamber is oriented at an angle of between approximately 15 degrees and 45 degrees relative to the inlet port and the tool port.

3. The pneumatic valve of claim 1, wherein the valve plug moves:
from the closed position to the accessory open position in response to a pressure reduction in the valve chamber relative to the inlet port;
from the accessory open position to the tool open position in response to the pressure reduction in the valve chamber relative to the inlet port; and
from the tool open position to the closed position in response to a pressure equalization in the valve chamber relative to the inlet port.

4. The pneumatic valve of claim 1, wherein the valve plug is biased in the closed position.

5. The pneumatic valve of claim 1, further comprising:
an accessory valve seat situated between the valve chamber and the accessory port; and
a tool valve seat situated between the valve chamber and the tool port,
wherein the valve plug comprises:
an accessory valve surface for engaging the accessory valve seat in the closed position; and
a tool valve surface for engaging the tool valve seat in the closed position and the accessory open position.

6. The pneumatic valve of claim 5, wherein the accessory valve seat is tapered such that a space is formed between the accessory valve seat and the accessory valve surface in the closed position.

7. The pneumatic valve of claim 5, wherein:
the accessory valve seat forms an accessory orifice;
the valve plug further comprises a protrusion projecting from the accessory valve surface;
an entirety of the protrusion is situated in the accessory orifice in the closed position; and
a portion of the protrusion is situated in the accessory orifice in the accessory open position.

8. The pneumatic valve of claim 7, wherein:
the accessory orifice has an accessory-orifice diameter;
the protrusion has a protrusion diameter; and
the protrusion diameter is at least one-half of the accessory-orifice diameter.

9. The pneumatic valve of claim 7, wherein:
the tool valve seat forms a tool orifice;
the tool orifice has a tool-orifice diameter;
the tool valve surface has a tool valve-surface length;
the protrusion has a protrusion length; and
the protrusion length is less than a difference between the tool valve-surface length and the tool-orifice diameter.

10. The pneumatic valve of claim 1, further comprising a passage formed in the valve body and in fluid communication with the valve chamber and the tool port,
wherein a pressure reduction in the valve chamber relative to the inlet port is in response to relieving pressure at the tool port.

11. The pneumatic valve of claim 1, further comprising a passage formed in the valve body and in fluid communication with the valve chamber,
wherein a pressure reduction in the valve chamber relative to the inlet port is in response to releasing pressure through the passage.

12. A pneumatic apparatus comprising:
a pneumatic valve comprising:
a valve body comprising a valve chamber having a longitudinal axis;
an inlet port formed through the valve body non-parallel to the longitudinal axis;
a tool port formed through the valve body non-parallel to the longitudinal axis;
an accessory port formed through the valve body parallel to the longitudinal axis; and
a valve plug situated in the valve chamber and movable along the longitudinal axis to selectively open and close a pneumatic flow between the inlet port, the accessory port, and the tool port in response to relative pressure between the valve chamber and the inlet port;
a pneumatic tool coupled to the tool port of the pneumatic valve; and
a pneumatic accessory coupled to the accessory port of the pneumatic valve.

13. The pneumatic apparatus of claim 12, wherein:
the pneumatic tool comprises a drill; and
the pneumatic accessory comprises a vacuum.

14. The pneumatic apparatus of claim 12, wherein the pneumatic accessory comprises a dispenser.

15. The pneumatic apparatus of claim 12, wherein the valve plug is movable between:
a closed position for restricting the pneumatic flow from the inlet port to the accessory port and the tool port;
an accessory open position for allowing the pneumatic flow from the inlet port to the accessory port while restricting the pneumatic flow from the inlet port to the tool port; and
a tool open position for allowing the pneumatic flow from the inlet port to the accessory port and to the tool port.

16. A method for controlling a pneumatic flow to a pneumatic tool and a pneumatic accessory, the method comprising:
providing a pneumatic valve comprising:
a valve body comprising a valve chamber having a longitudinal axis;
an inlet port formed through the valve body non-parallel to the longitudinal axis;
a tool port formed through the valve body non-parallel to the longitudinal axis;
an accessory port formed through the valve body parallel to the longitudinal axis; and
a valve plug situated in the valve chamber;
coupling the pneumatic tool to the tool port;
coupling the pneumatic accessory to the accessory port;
supplying the pneumatic flow to the inlet port; and
moving the valve plug along the longitudinal axis to selectively open and close the pneumatic flow between the inlet port, the accessory port, and the tool port in response to relative pressure differential between the valve chamber and the inlet port.

17. The pneumatic apparatus of claim 12, wherein the longitudinal axis of the valve chamber is oriented at an angle of between approximately 15 degrees and 45 degrees relative to the inlet port and the tool port.

18. The method of claim 16, further comprising:
biasing the valve plug in a closed position; and
restricting the pneumatic flow from the inlet port to the accessory port and the tool port.

19. The method of claim 18, further comprising:
moving the valve plug from the closed position to an accessory open position in response to a pressure reduction in the valve chamber relative to the inlet port;
allowing the pneumatic flow from the inlet port to the accessory port; and restricting the pneumatic flow from the inlet port to the tool port.

20. The method of claim 19, further comprising:

moving the valve plug from the accessory open position to a tool open position in response to the pressure reduction in the valve chamber relative to the inlet port; and allowing the pneumatic flow from the inlet port to the accessory port and to the tool port.

* * * * *